(12) United States Patent
Mehr et al.

(10) Patent No.: US 9,189,961 B2
(45) Date of Patent: Nov. 17, 2015

(54) METHOD AND SYSTEM FOR AUTONOMOUS TRACKING OF A FOLLOWING VEHICLE IN THE LANE OF A LEADING VEHICLE

(71) Applicant: Continental Teves AG & Co. oHG, Frankfurt (DE)

(72) Inventors: Wilfried Mehr, Wolfurt (AT); Ulrich Stählin, Eschborn (DE); Stefan Lüke, Bad Homburg (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/400,906

(22) PCT Filed: May 6, 2013

(86) PCT No.: PCT/EP2013/059398
§ 371 (c)(1),
(2) Date: Nov. 13, 2014

(87) PCT Pub. No.: WO2013/171089
PCT Pub. Date: Nov. 21, 2013

(65) Prior Publication Data
US 2015/0127189 A1      May 7, 2015

(30) Foreign Application Priority Data

May 16, 2012      (DE) .......................... 10 2012 208 256

(51) Int. Cl.
*G06F 7/00*        (2006.01)
*G08G 1/00*        (2006.01)
(Continued)

(52) U.S. Cl.
CPC ............... *G08G 1/22* (2013.01); *B60W 30/165* (2013.01); *G05D 1/0293* (2013.01); *G05D 1/0295* (2013.01); *B60W 2050/0095* (2013.01); *B60W 2550/408* (2013.01)

(58) Field of Classification Search
CPC ..................... B60W 30/165; B60W 2550/408; G05D 1/0293; G05D 1/0295; G08G 1/22
USPC .......................... 701/1, 29.6, 93, 96, 116, 300
See application file for complete search history.

(56) References Cited

U.S. PATENT DOCUMENTS 6,128,559  A    10/2000  Saitou
8,362,911  B2   1/2013   Kolb
(Continued)

FOREIGN PATENT DOCUMENTS

DE         4133882       4/1992
DE         19843666      3/2000
(Continued)

OTHER PUBLICATIONS

International Search Report for International Application No. PCT/EP2013/059398 mailed Aug. 5, 2013.
(Continued)

*Primary Examiner* — Kim T Nguyen
(74) *Attorney, Agent, or Firm* — RatnerPrestia (57) ABSTRACT

A method and system for autonomous tracking of a following vehicle on the track of a leading vehicle. A lead message is received by the following vehicle and rejected by the following vehicle or confirmed with a follow message. After receipt of the follow message, a first element of coordination information for coordination of the autonomous tracking is sent to the following vehicle by the leading vehicle. A second element of coordination information is detected for coordination of the autonomous tracking by environment sensors of the following vehicle on the basis of movements of the leading vehicle. The first and second elements of coordination information are compared by the following vehicle. In the case of a matching comparison result, the autonomous tracking is performed corresponding to the first and second elements of coordination information and, in the case of a deviating comparison result, the autonomous tracking is ended.

12 Claims, 2 Drawing Sheets

(51) Int. Cl.
    *B60W 30/165*    (2012.01)
    *G05D 1/02*    (2006.01)
    *B60W 50/00*    (2006.01)

(56) References Cited

U.S. PATENT DOCUMENTS

| | | |
|---|---|---|
| 8,676,466 B2 | 3/2014 | Mudalige |
| 2007/0083318 A1 | 4/2007 | Parikh |
| 2010/0222976 A1 | 9/2010 | Haug |
| 2010/0256835 A1 | 10/2010 | Mudalige |
| 2013/0124064 A1* | 5/2013 | Nemoto ............ 701/96 |
| 2013/0165146 A1 | 6/2013 | Stahlins |
| 2013/0211624 A1* | 8/2013 | Lind et al. ............ 701/2 |

FOREIGN PATENT DOCUMENTS

| | | |
|---|---|---|
| DE | 10144797 | 3/2003 |
| DE | 102006050214 | 5/2007 |
| DE | 102006056094 | 5/2008 |
| DE | 102007024877 | 12/2008 |
| DE | 102008022046 | 7/2009 |
| DE | 102010013647 | 2/2011 |
| DE | 102011079052 | 3/2012 |
| EP | 0991046 | 4/2000 |

OTHER PUBLICATIONS

German Search Report mailed Feb. 13, 2013 in German Application No. 10 2012 208 256.5, including partial translation.

Yan, G, et al., "Providing VANET security through active positive detection," Computer Communications, 2008, pp. 1-15.

Bissmeyer, N., et al, "Intrusion Detection in Car-to-X Communication Based on Movement Information," Oct. 11, 2011, pp. 81-94, Automotive security 27.

* cited by examiner

METHOD AND SYSTEM FOR AUTONOMOUS TRACKING OF A FOLLOWING VEHICLE IN THE LANE OF A LEADING VEHICLE

CROSS REFERENCE TO RELATED APPLICATIONS

This application is the U.S. National Phase application of PCT International Application No. PCT/EP2013/059398, filed May 6, 2013, which claims priority to German Patent Application No. 10 2012 208 256.5, filed May 16, 2012, the contents of such applications being incorporated by reference herein.

FIELD OF THE INVENTION

The invention relates to a method for autonomously tracking a following vehicle in the lane of a leading vehicle and to a system for autonomously tracking a following vehicle in the lane of a leading vehicle.

BACKGROUND OF THE INVENTION

The prior art already discloses a multiplicity of different sensor systems for environment sensing. By way of example, these sensor systems can be used to recognize lane boundaries or to determine the distance from a vehicle ahead and hence a relative position for the vehicle ahead. A relative speed in relation to the vehicle ahead can also be determined by means of the known sensor systems. Similarly, it is already known practice to use wirelessly communicating vehicle-to-X communication systems to exchange information with surrounding vehicles or infrastructure devices. The vehicle-to-X messages sent by the vehicles usually comprise at least an absolute position, an absolute speed and a piece of information about the direction of travel.

In this context, DE 10 2006 050 214 A1, which is incorporated by reference, discloses a lane recognition method for assisting a driver in driving a vehicle. This first of all involves roadway edge recognition being performed, e.g. by means of infrared sensors, cameras and radar scanners. On the basis of the evaluation of the sensor signals according to features that represent the surface quality of the road and of the road edge, a change of lane is recognized. If it is now recognized that the vehicle leaves the lane without the indicator having been operated, a warning signal is sent to the driver. This warning signal may be visual, audible or haptic.

DE 41 33 882 A1, which is incorporated by reference, describes a method for automatically tracking a vehicle in a lane of a vehicle traveling ahead. In this case, the vehicle behind comprises an electronic camera that continuously produces image signals for significant rear areas of the guiding vehicle. Electronic image evaluation of the image signals likewise continuously ascertains the distance from the guiding vehicle and also the lateral offset of the guiding vehicle in relation to the longitudinal axis of the driver's own vehicle. This information in turn is used to calculate the steering angle that is required in order to follow the guiding vehicle. The calculated steering angle is set by a stepping motor connected to the steering shaft of the vehicle, without the need for the driver to intervene. Distance regulation is not described in DE 41 33 882 A1.

DE 10 2007 024 877 A1, which is incorporated by reference, discloses a method for forming and controlling a vehicle union. To this end, vehicle identification data from various vehicles are transmitted among said vehicles by means of vehicle-to-vehicle communication. A first vehicle then transmits an initiation message in order to initiate the formation of the vehicle union. Surrounding vehicles react to reception of the initiation message by sending an acceptance message or a rejection message. If a rejection message is sent, the sending vehicle does not join the union. If an acceptance message is sent, the first vehicle must then for its part confirm the inclusion in the vehicle union by sending a further acceptance message. If the first vehicle sends a rejection message, on the other hand, then the further vehicle is not included in the union. As soon as a union has been formed from two or more vehicles, the driving movements scheduled in future are coordinated by means of vehicle-to-vehicle communication. In this case, data from future scheduled driving movements by the first vehicle in the vehicle union are captured and transmitted to the further vehicles. On the basis of the received data, the further vehicles schedule an appropriate driving movement of their own.

A disadvantage of the methods known from the prior art is that the information available to a following vehicle does not just need to have a very high level of reliability on account of the high safety requirements in road traffic but also needs to be transmitted and then captured by a following vehicle with a very high level of reliability, without the prior art disclosing a solution to achieve this prerequisite, however. The absence of the information required for autonomous travel or the capture of incorrect information or the incorrect capture of correct information can lead to serious accidents. This high risk potential and the requirements arising therefrom for the reliability of such methods have meant that it has not been possible to date to realize autonomous following travel by one or more vehicles in public road traffic apart from during stringently monitored trial performance.

SUMMARY OF THE INVENTION

An aspect of the invention proposes a method that allows autonomous following travel by one or more vehicles in road traffic and in so doing meets the high safety requirements in this connection.

According to an aspect of the inventive method for autonomously tracking a following vehicle in the lane of a leading vehicle, in which the leading vehicle is controlled by a driver, the leading vehicle uses vehicle-to-X communication to send a lead message that signals the readiness for the autonomous tracking of following vehicles and comprises at least one piece of vehicle identification information and a piece of route information for the leading vehicle. The lead message is received by the following vehicle by means of vehicle-to-X communication and is rejected by said following vehicle or confirmed with a follow message that comprises at least one piece of vehicle identification information for the following vehicle. Having received the follow message, the leading vehicle uses vehicle-to-X communication to send first pieces of coordination information for coordinating the autonomous tracking to the following vehicle until the autonomous tracking ends. The method is distinguished in that second pieces of coordination information for coordinating the autonomous tracking are captured by means of ambient sensors of the following vehicle on the basis of driving movements by the leading vehicle, wherein the first and second pieces of coordination information are compared by the following vehicle, wherein if there is a match in the comparison result then the autonomous tracking corresponding to the first and second pieces of coordination information is carried out and wherein if there is a discrepancy in the comparison result then the autonomous tracking is terminated.

By sending the lead message, the leading vehicle provides other vehicles in its direct surroundings with a direct opportunity to be autonomously tracked to the leading vehicle. In this case, the sending of the lead message can be initiated by the driver of the leading vehicle, which means that the driver himself can decide whether he provides his vehicle as a leading vehicle. Since the leading vehicle sometimes has to travel in a comparatively conservative and uniform style of travel in order to track one or more following vehicles safely and conveniently, it may occur that a driver does not wish to provide his vehicle as a leading vehicle in certain situations. The fact that the lead message comprises at least one piece of vehicle identification information and a piece of route information for the leading vehicle results in the advantage that the driver of a following vehicle first of all receives a piece of information about which of the vehicles in his surroundings is providing the opportunity to be autonomously tracked to it.

The route information that is likewise included results in the further advantage that the driver of the following vehicle is able to decide about whether the vehicle that is sending the control information is suitable as a leading vehicle for him or appears unsuitable as a leading vehicle for him on account of greatly different destinations of travel. The sending of the follow message by the following vehicle results in the advantage that the leading vehicle receives a piece of information to the effect that a following vehicle wishes to be autonomously tracked to it. Since the follow message also comprises a piece of vehicle identification information from the following vehicle, the driver of the leading vehicle additionally receives a piece of information about which of the vehicles in his surroundings wishes to be tracked to him. This results in the advantage that the driver of the leading vehicle is provided with the opportunity to reject the vehicle sending the follow message as a following vehicle. In this case, it is either possible for a rejection message to be sent to the following vehicle or for the first pieces of coordination information not to be sent. In the latter case, the follow request from the following vehicle is thus simply ignored.

At the request of the driver of the leading vehicle, the lead message can be sent at regular intervals, e.g. every 5 s. It is also possible for the lead message to be sent once when initiated by the driver of the leading vehicle.

In this case, the piece of vehicle identification information may be embodied as an anonymized pseudonym in conjunction with a location statement, but may similarly also be embodied as a description of the appearance of the sending vehicle (e.g. make, type, color) or as a statement indicating the license number of the sending vehicle. Combinations of these embodiment options are also possible.

If the driver of the following vehicle wishes to terminate the autonomous tracking, e.g. because he has reached his destination or because the journey route that he knows for the leading vehicle differs from the scheduled journey route of the following vehicle from a particular point and this point has been reached, he can retake complete control of the following vehicle himself at any time. By way of example, this can be accomplished by means of a suitable input device, such as a pushbutton switch, operation of which prompts the following vehicle to terminate the autonomous tracking. Similarly, the desire of the driver of the following vehicle to take control can be signaled by means of the operation of a pedal or of the steering wheel. In this case too, provision may be made for the driver to be given back full control of his vehicle in an instant. This furthermore ensures that the driver can correct an autonomous driving maneuver by the following vehicle at any time if necessary or desired. When the autonomous tracking is terminated by the following vehicle, the leading vehicle can be sent a corresponding message from the following vehicle, for example, so that it is informed that the following vehicle is no longer being autonomously tracked.

Conversely, the driver of the leading vehicle also advantageously has the opportunity to terminate the autonomous tracking. In this case, the leading vehicle sends a corresponding message to the following vehicle and the following vehicle outputs this information to the driver of the following vehicle. In this case, it is important that the autonomous tracking of the following vehicle is not terminated suddenly and in a manner that is unexpected for the driver of the following vehicle, but rather, where possible, is terminated only with some time delay in order to provide the driver of the following vehicle with the opportunity and time to obtain an overview of the current driving situation and to take control of his vehicle. In particular, provision may be made for the autonomous tracking in this case to be terminated only when the driver of the following vehicle has indicated that he is ready to take control, e.g. by means of operation of a pushbutton switch. Otherwise, the risk of a traffic accident would be increased by sudden and impromptu transfer of control to the driver of the following vehicle.

In particular, advantages also arise for the use of the inventive method in HGVs, since these usually travel long distances and at largely constant speed, which simplifies safe and convenient autonomous tracking. During the autonomous tracking, it is also possible to reduce the safety distance between the individual vehicles, since the inventive method is capable of faster reactions than a human driver. The relatively short distance between the vehicles traveling in the convoy in turn reduces the air resistance for the following vehicles, since they can make use of the slipstream of the leading vehicle or of the following vehicle traveling ahead. There is therefore also a resultant reduction in fuel consumption.

An aspect of the invention provides a series of advantages that each improve the safety and reliability of the autonomous tracking of a following vehicle in the lane of a leading vehicle in comparison with known methods of the type in question. A significant contribution to improving safety is made particularly by the redundant capture of the coordination information.

It is furthermore possible for the inventive method to be combined with a business model. By way of example, the driver of a leading vehicle can combine the offer, send by means of the lead message, to autonomously track other vehicles with payment of a fee that needs to be paid to him. The implementation of the inventive method may also be of interest to taxi companies, since the taxi vehicles can be used as commercial leading vehicles. In this case, the customers of the taxi company firstly have the advantage that they do not have to drive themselves but secondly do not also have to forego the convenience of their own vehicle.

Preferably, provision is made for the vehicle-to-X communication between the leading vehicle and the following vehicle during the autonomous tracking to take place in redundant form using at least two different communication means. This results in the advantage that even if the communication means for the vehicle-to-X communication between the two vehicles has a connection with brief interference or interruption it is still possible for the first pieces of coordination information to be sent and received. This increases the robustness of the inventive method. In addition, the redundantly transmitted first pieces of coordination information can also be compared with one another or individually compared with the second pieces of coordination information. If there is no match in the comparison result, provision may particularly be made for the autonomous tracking to be terminated. This contributes to the improved safety of the inventive method.

In addition, it is preferred for the ambient sensors of the following vehicle to be used to capture third pieces of coordination information on the basis of traffic indicators and/or fourth pieces of coordination information on the basis of digital map material, wherein the third and/or fourth pieces of coordination information are compared with the first and second pieces of coordination information, wherein if there is a match in the comparison result then the autonomous tracking corresponding to the first and second and third and/or fourth pieces of coordination information is carried out and wherein if there is a discrepancy in the comparison result then the autonomous tracking is terminated. This further increases the safety and reliability of the inventive method, since the third and fourth pieces of coordination information provide additional information that terminates the autonomous tracking if there is no match in the comparison result. It is thus necessary for all three or four pieces of coordination information to match in order to allow the autonomous tracking. Since the third pieces of coordination information comprise traffic indicators, such as signs, traffic lights, lane boundaries, etc., it is normally not possible for the full information content of the third pieces of coordination information to be compared with the information content of the first or second pieces of coordination information. According to the invention, it is therefore particularly preferred for a match in a comparison result to be recognized when there is no inconsistency between the first and second pieces of coordination information and the third pieces of coordination information. The same applies to the fourth pieces of coordination information, the information content of which usually likewise cannot be compared completely with the information contents of the first and second and/or third pieces of coordination information.

The third pieces of coordination information are captured particularly by means of ambient sensors, such as stereo camera sensors or monocamera sensors, and the fourth pieces of coordination information are read particularly from a digital memory that is existent in the following vehicle or are retrieved from a server by means of a wireless data link.

A further advantage arising from the capture of the third and fourth pieces of coordination information is that any behavior of the leading vehicle contrary to road traffic regulations, such as excessive speed on a section of road with a speed limit, can be recognized. In this case, the autonomous tracking is advantageously terminated.

Advantageously, provision is made for the first pieces of coordination information to comprise absolute position information and absolute speed information and absolute steering angle information and absolute orientation information for the leading vehicle and for the second pieces of coordination information to comprise relative position information and relative speed information and relative orientation information for the leading vehicle in relation to the following vehicle. The known, absolute position of the driver's own vehicle can be used to convert the absolute information into relative information, and vice versa. With particular preference, the conversion of the absolute information into relative information and vice versa takes place before the pieces of coordination information are compared.

The first pieces of coordination information received by means of vehicle-to-X communication describe the lane and the location-specific driving behavior of the leading vehicle. The second pieces of coordination information are captured by means of suitable ambient sensors and hence independently of the first pieces of coordination information. The inventive comparison is used to ascertain whether the first and second pieces of coordination information describe a lane of the leading vehicle that matches within the scope of the measurement inaccuracy and a location-specific driving behavior of the leading vehicle that matches within the scope of the measurement inaccuracy. If a match in a comparison result is recognized, the following vehicle is autonomously tracked to the leading vehicle. Otherwise, the autonomous tracking is terminated and control of the following vehicle is transferred to the driver of the following vehicle.

In a further preferred embodiment, provision is made for the autonomous tracking to comprise autonomous longitudinal regulation and autonomous transverse regulation of the following vehicle on the basis of the match in the comparison result for the first and second and/or third and/or fourth pieces of coordination information. This results in the advantage that control of the vehicle is taken completely by the inventive method and the driver of the following vehicle is largely relieved of vehicle control.

Preferably, the method is distinguished in that more than just a single following vehicle is autonomously tracked, wherein, in the case of autonomous tracking of more than just one following vehicle, the second pieces of coordination information are captured by means of the ambient sensors of the respective following vehicle on the basis of the driving movement by a following vehicle traveling ahead of the respective following vehicle. This results in the advantage that a leading vehicle does not need to be found for every single following vehicle, since a single leading vehicle can track a multiplicity of following vehicles. If a following vehicle does not follow the leading vehicle directly but rather follows a following vehicle traveling ahead, the first and second pieces of coordination information are compared by virtue of the first pieces of coordination information from a leading vehicle, which are captured by means of vehicle-to-X communication, being compared with the second pieces of coordination information, which are captured by means of ambient sensors, on the basis of the driving movements by the following vehicle traveling directly ahead. The first pieces of coordination information can either be sent directly from the leading vehicle to all following vehicles or else can be forwarded in a chain of following vehicles by means of what is known as a "multihop" method. If a match between the first and second pieces of coordination information is recognized, it can be assumed that the following vehicle traveling ahead has already compared the first pieces of coordination information with the second pieces of coordination information, which are captured on the basis of the driving movements by the vehicle ahead of said following vehicle, and has recognized a match, since it is following the first pieces of coordination information. This method is carried out in the chain of following vehicles by each following vehicle in succession, which means that the first following vehicle captures the second piece of coordination information directly on the basis of the driving movements by the leading vehicle.

Expediently, provision is made for a driver of the following vehicle to be asked to make a manual input during the autonomous tracking of the following vehicle, with the autonomous tracking being terminated if the manual input is not made. The manual input may be a repeated input at intervals of time that needs to be made at regular or random intervals. By way of example, the driver can be asked to make the input within a particular period of time, e.g. 2 s, by means of a visual, haptic or audible indication. It is likewise conceivable for there to be ongoing input throughout the tracking by means of what is known as a "dead man's switch". This results in the advantage that the driver of the following vehicle necessarily needs to continue to be concerned with the vehicle at least to a certain extent and must, in particular, be prepared to retake complete vehicle control at any time. By way of example, the driver is therefore unable to become completely engrossed in another occupation. This increases the safety of the overall method, since the driver of the following vehicle can take control of the following vehicle comparatively quickly in the event of problems, faults or the occurrence of unexpected or critical driving situations.

Preferably, provision is made for a period of time for the autonomous tracking to be limited to a prescribed proportion of a prescribed interval of time, particularly to 50 minutes per hour. This repeatedly returns vehicle control to the driver of the following vehicle at particular intervals, which continues to divert the attention of the driver to the driving on a regular basis, which likewise contributes to the safety of the inventive method. This allows the driver to find his bearings comparatively quickly in the driving situation that arises when vehicle control is suddenly returned. The prescribed proportion of the prescribed time interval may be a contiguous block of time or else may be split into a plurality of shorter blocks of time that are separated from one another by times in which the driver controls the following vehicle himself. In this case, the sum of the times of the shorter blocks corresponds to the prescribed proportion of the prescribed time interval. Despite the interruptions in the autonomous tracking, there is significant relief for the driver of the following vehicle.

Furthermore, it is advantageous that the following vehicle uses seat occupancy recognition to monitor whether the driver is in the driver's seat, with the autonomous tracking being terminated if the driver is not in the driver's seat. This results in the advantage that the inventive method is carried out only so long as the driver does not leave the driver's seat during the journey and hence is always in a position to take control of the vehicle should this become necessary. This likewise contributes to safety when the inventive method is implemented in road traffic. The seat occupancy recognition can be implemented by means of a sensor integrated in the driver's seat or a camera directed into the passenger space, for example.

In addition, provision is made for the sent piece of vehicle identification information from the following vehicle to be used to produce a piece of remuneration information that is specific to the following vehicle and that is dependent on distance and/or time. This technical feature results in the advantage that the method according to the invention can find its way into commercial driving services. The driver of the leading vehicle or the service provider to which the following vehicle belongs can therefore be renumerated on the basis of distance or on the basis of time.

The present invention also relates to a system for autonomously tracking a following vehicle in the lane of a leading vehicle that carries out the inventive method, in particular. The system comprises at least one leading vehicle controlled by a driver, a following vehicle, vehicle-to-X communication means in the leading vehicle and in the following vehicle for sending and receiving messages and information, driving movement sensors in the leading vehicle for providing first pieces of coordination information, coordination information comparison means in the following vehicle for comparing different pieces of coordination information and also ambient sensors in the following vehicle and/or a map memory, containing a digital map, in the following vehicle.

The leading vehicle sends a lead message that signals the readiness for autonomous tracking of following vehicles and comprises at least one piece of vehicle identification information and a piece of route information for the leading vehicle, wherein the following vehicle receives the lead message and rejects it or confirms it with a follow message that comprises at least one piece of vehicle identification information from the following vehicle. Having received the follow message, up until the autonomous tracking ends, the leading vehicle sends the first pieces of coordination information for coordinating the autonomous tracking to the following vehicle. The inventive system is distinguished in that the ambient sensors of the following vehicle capture second pieces of coordination information for coordinating the autonomous tracking on the basis of driving movements by the leading vehicle, wherein the coordination information comparison means compare the first and second pieces of coordination information, wherein the following vehicle carries out autonomous tracking corresponding to the first and second pieces of coordination information in the event of a match in the comparison result and wherein the following vehicle terminates the autonomous tracking in the event of a discrepancy in the comparison result. Since the inventive system comprises all the means necessary for carrying out the inventive method and, in particular, carries out the inventive method, this results in the advantages already described.

Preferably, provision is made for the ambient sensors to be one or more elements from the group
  radar sensor,
  optical camera sensor,
  lidar sensor,
  laser sensor and
  ultrasonic sensor and
for the vehicle-to-X communication means to send and/or receive messages and/or information on the basis of one or more connection classes from the group
  WLAN connection, particularly based on IEEE 802.11,
  ISM (Industrial, Scientific, Medical Band) connection,
  Bluetooth® connection,
  ZigBee connection,
  UWB (ultrawide band) connection,
  WiMax® (Worldwide Interoperability for Microwave Access) connection,
  infrared connection,
  mobile radio connection and
  radar-based communication.

Said ambient sensors are suited to capturing location and movement information from a vehicle ahead and hence capturing the second pieces of coordination information. The cited connection types afford different advantages, depending on type, wavelength and data protocol used. Thus, some of the cited connection types allow a comparatively high data transmission rate and comparatively fast connection setup, for example, whereas others are mostly very well suited to data transmission around visual obstacles. The combination and simultaneous or parallel use of a plurality of these connection types result in further advantages, since in this way it is also possible for disadvantages of individual connection types to be compensated for. All of the cited connection types are suited to transmitting the first pieces of coordination information. In this case, radar-based communication affords the particular advantage that it can be used specifically for transmitting information between the following vehicle and the leading vehicle, since an existent radar sensor is usually used for determining the distance between the following vehicle and the leading vehicle during tracking anyway. In this case, a communication signal is modulated onto the radar signal. The radar signal can therefore perform a dual function during autonomous tracking.

BRIEF DESCRIPTION OF THE DRAWINGS

Further preferred embodiments will emerge from the subclaims and the description below of an exemplary embodiment with reference to figures, in which

DETAILED DESCRIPTION OF THE PREFERRED EMBODIMENTS

Figure 1A:
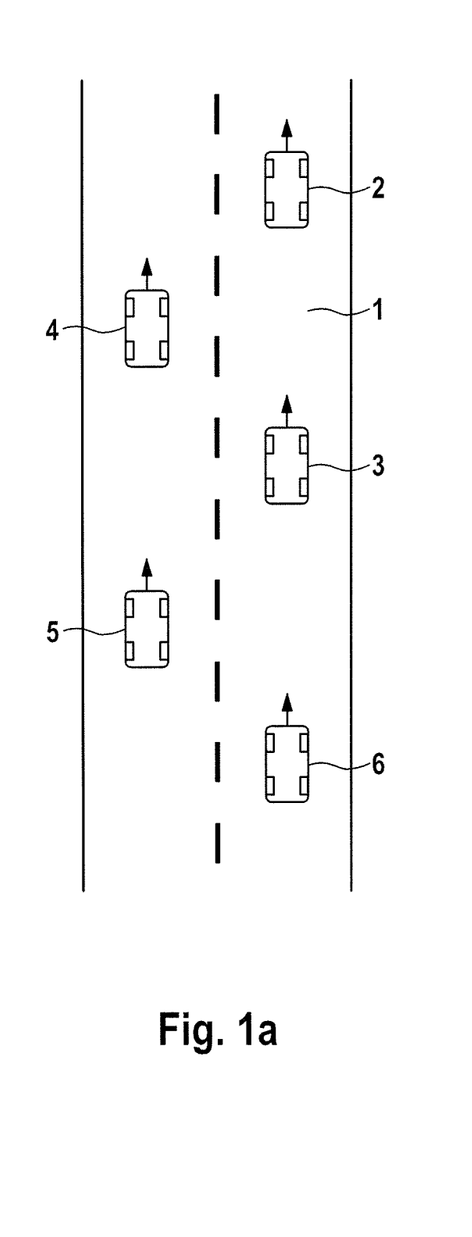
FIG. 1 shows the formation of a vehicle union comprising a leading vehicle and two following vehicles.

FIG. 1a shows a two-lane road 1 on which vehicles 2, 3, 4, 5 and 6 are traveling. The arrows on the vehicles show the direction of travel. Vehicles 2, 3, 4, 5 and 6 are equipped with the inventive system for carrying out the inventive method. The driver of vehicle 2 decides to offer the vehicles in his surroundings the opportunity to be autonomously tracked to him. To this end, he initiates the sending of a lead message by means of a WLAN communication unit that is existent in the leading vehicle. The lead message comprises a piece of vehicle identification information in the form of a vehicle description (make, type, color and location statement) and also a piece of route information contained in the navigation system of vehicle 2. The lead message is sent at regular intervals of time of 10 s. Vehicles 3, 4, 5 and 6 receive the lead message and use a visual display device to display it to their drivers.

The driver of vehicle 4 recognizes vehicle 2 as a leading vehicle from the vehicle identification information and decides to have his vehicle 4 autonomously tracked, since the piece of route information that the lead message contains matches his own route planning for a large section of distance. He accordingly initiates the sending of a follow message in order to inform the driver of vehicle 2 that he would like to autonomously track vehicle 2. The follow message for its part comprises a piece of vehicle identification information in the form of a vehicle description (make, type, color and location statement) that is then visually displayed to the driver of vehicle 2. Having received the follow message, the leading vehicle 2 begins to send first pieces of coordination information by means of WLAN. At the same time, a radar sensor that is existent in vehicle 4 captures second pieces of coordination information. As soon as the driver of vehicle 4 has positioned vehicle 4 behind leading vehicle 2, vehicle 4 is autonomously tracked.

Vehicle 3 also receives the lead message for vehicle 2 and the driver of vehicle 3 likewise decides to be autonomously tracked to vehicle 2, even though his own route planning differs from the route planning of leading vehicle 2 after just a few kilometers. The driver of vehicle 3 nevertheless hopes to be relieved from duties pertaining to events on the road by the autonomous tracking even over just a short distance. He initiates the sending of a follow message from vehicle 3 to vehicle 2. Vehicle 3 then begins to use a lidar sensor to capture second pieces of coordination information. Vehicle 2 displays the piece of vehicle identification information from vehicle 3 to the driver in visually displayed form. The driver of vehicle 2 is therefore informed that vehicles 4 and 3 are intended to be autonomously tracked to him.

Vehicle 5 likewise receives the lead message from vehicle 2 and displays it to the driver of vehicle 5. Since the driver of vehicle 5 is in a hurry, however, he decides to reject the lead message and not to have vehicle 5 autonomously tracked, even though the route planning of vehicle 2 largely matches his own route planning. The driver of vehicle 5 bases this on the consideration that he will reach his destination more quickly using a sportier and more dynamic driving style than is possible from a vehicle union. The rejection is made by virtue of vehicle 5 not responding to the lead message with a follow message but rather ignoring it.

Vehicle 6 also receives the lead message from vehicle 2. Since the driver of vehicle 6 has no interest in being autonomously tracked to vehicle 2 on account of different route planning than vehicle 2, however, he does not initiate the sending of a follow message and leaves the lead message without a response.

Figure 1B:
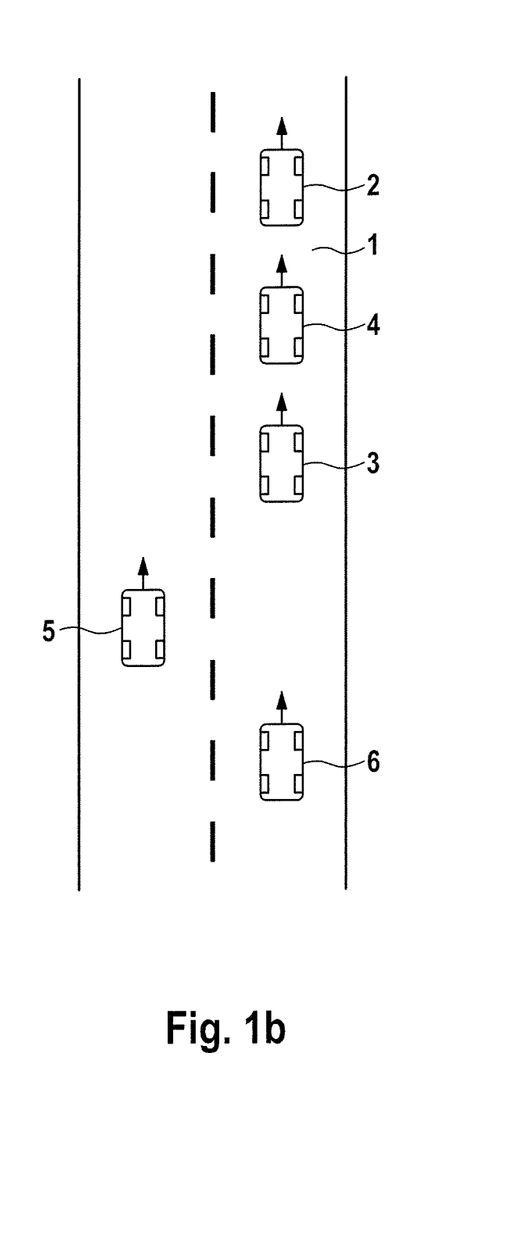

In FIG. 1b, the driver of vehicle 4 has positioned vehicle 4 behind leading vehicle 2, and vehicle 4 autonomously tracks leading vehicle 2. The taking of control by the inventive method is indicated to the driver of vehicle 4. Vehicle 4 begins to compare the first pieces of coordination information, received via WLAN, with the second pieces of coordination information, captured via the radar sensor. The first and second pieces of coordination information each describe the driving behavior of vehicle 2. So long as a match is recognized between the first and second pieces of coordination information, vehicle 4 autonomously tracks vehicle 2. Since vehicle 2 has a rearward radar sensor and vehicle 4 has a forwardly directed radar sensor, the first pieces of coordination information are transmitted from leading vehicle 2 to following vehicle 4 not exclusively by means of a WLAN connection but rather additionally by means of the radar sensors by virtue of the radar signals having a communication signal modulated onto them that likewise transmits the first pieces of coordination information. Hence, the first pieces of coordination information are transmitted between leading vehicle 2 and following vehicle 4 redundantly. Vehicle 3 receives the first pieces of coordination information from leading vehicle 2 directly as well. By contrast, the second pieces of coordination information are captured by means of a lidar sensor on the basis of the driving movements by vehicle 4. The comparison of the first and second pieces of coordination information performed by vehicle 3 is therefore based on a comparison of the driving behavior of vehicle 4 measured by sensor with the driving behavior transmitted by vehicle 2. In addition, vehicle 3 uses a stereo camera to capture traffic indicators as third pieces of coordination information in the form of roadway markings, road signs and traffic lights and also fourth pieces of coordination information on the basis of digital map material. The digital map material comprises information about road profiles, zones with a limited maximum permissible speed and details about road signs. So long as a discrepancy is not found between the different pieces of coordination information that are present in vehicle 3, vehicle 3 is autonomously tracked to vehicle 2. Vehicle 5, which has not joined the vehicle union comprising vehicles 2, 3 and 4, begins an overtaking maneuver and vehicle 6 follows the vehicle union at some distance.

In order to ensure that the drivers of vehicles 3 and 4 are prepared to be able to retake control as quickly as possible in any safety-critical situation that arises, both drivers need to operate a pushbutton switch at irregular intervals of time upon a respective visual request. If the pushbutton switch is not operated within 2 seconds after a request, autonomous tracking is terminated for safety reasons, since it is assumed that the driver is too greatly distracted or is too inattentive for the autonomous tracking to be able to be continued safely. In this case, the driver is audibly made aware that control is being returned to him as soon as he signals his readiness for this. In accordance with the example, readiness is signaled by the driver using a pushbutton switch provided for this purpose or by means of operation of vehicle control means, such as the steering wheel or a pedal. If readiness for the driver to take control is not signaled within a period of 10 s, the hazard warning lights of the vehicle are automatically activated and the vehicle is autonomously steered to the right-hand edge of the roadway and stops there.

Figure 2:
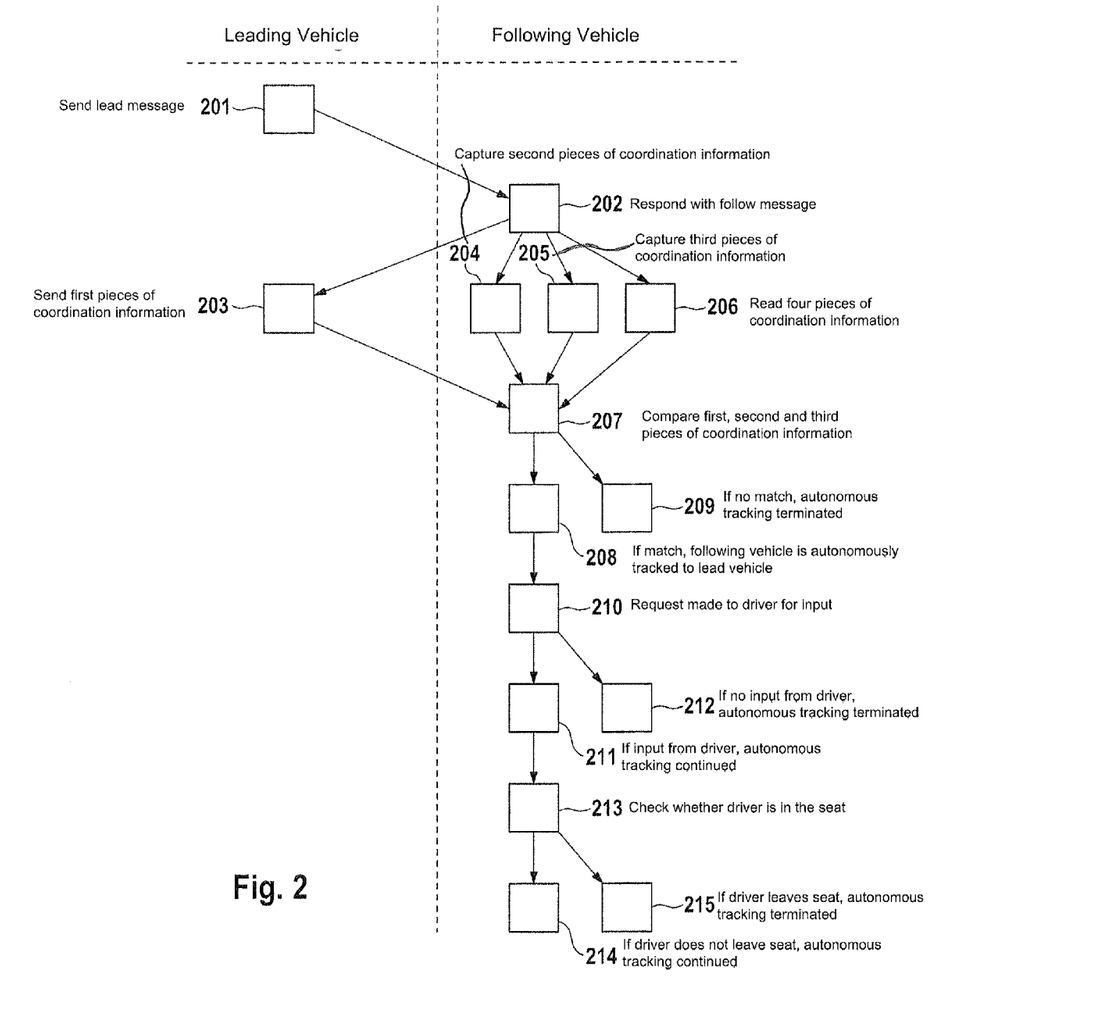
FIG. 2 shows a flowchart with a possible sequence of the inventive method.

FIG. 2 shows a flowchart with an exemplary sequence for the inventive method. In step 201, a leading vehicle sends a lead message, to which a following vehicle responds with a follow message in step 202. This in turn prompts the sending of first pieces of coordination information from the leading vehicle to the following vehicle in method step 203. At the same time, the following vehicle begins to capture second pieces of coordination information by means of ambient sensors in step 204, to capture third pieces of coordination information by means of a suitable camera sensor in step 205 and read four pieces of coordination information from a digital map memory in step 206. In the next method step 207, the first, second, third and fourth pieces of coordination information are compared in the following vehicle. If the comparison of all the pieces of coordination information leads to a match in the comparison result, the following vehicle is autonomously tracked to the leading vehicle in step 208. Otherwise, there is no autonomous tracking or the autonomous tracking is terminated in step 209. If the following vehicle is autonomously tracked in step 208, a regular request is made to the driver in step 210 for him to make a manual input in order to indicate to the system that he is sufficiently attentive to be able to take control of the vehicle, possibly briefly, if required. If the input is made within a period of 3 s after a request, the autonomous tracking is continued in step 211, otherwise the autonomous tracking is terminated in step 212. In method step 213, continuous seat occupancy recognition also takes place, which is used to check whether the driver is in the driver's seat. If the driver leaves the driver's seat during the journey, autonomous tracking is terminated in step 215. If the driver does not leave the driver's seat, autonomous tracking is continued in method step 214.

The invention claimed is:

1. A method for autonomously tracking a following vehicle in a lane of a leading vehicle,
   in which the leading vehicle is controlled by a driver,
   wherein the leading vehicle uses vehicle-to-X communication to send a lead message that signals readiness for autonomous tracking of following vehicles and comprises at least one piece of vehicle identification information and a piece of route information for the leading vehicle,
   wherein the lead message is received by the following vehicle by vehicle-to-X communication and is rejected by said following vehicle or confirmed with a follow message that comprises at least one piece of vehicle identification information for the following vehicle, and
   wherein the leading vehicle, having received the follow message, uses vehicle-to-X communication to send first pieces of coordination information for coordinating the autonomous tracking to the following vehicle until the autonomous tracking ends, wherein
   second pieces of coordination information for coordinating the autonomous tracking are captured by ambient sensors of the following vehicle on the basis of driving movements by the leading vehicle,
   wherein the first and second pieces of coordination information are compared by the following vehicle to generate a comparison result,
   wherein if there is a match in the comparison result then the autonomous tracking corresponding to the first and second pieces of coordination information is carried out and
   wherein if there is a discrepancy in the comparison result then the autonomous tracking is terminated.

2. The method as claimed in claim 1, wherein the vehicle-to-X communication between the leading vehicle and the following vehicle during the autonomous tracking takes place in redundant form using at least two different communication means.

3. The method as claimed in claim 1, wherein the ambient sensors of the following vehicle are used to capture third pieces of coordination information on the basis of traffic indicators and/or fourth pieces of coordination information on the basis of digital map material,
   wherein the third and/or fourth pieces of coordination information are compared with the first and second pieces of coordination information to generate a second comparison result,
   wherein if there is a match in the second comparison result then the autonomous tracking corresponding to the first and second and third and/or fourth pieces of coordination information is carried out and
   wherein if there is a discrepancy in the second comparison result then the autonomous tracking is terminated.

4. The method as claimed in claim 3, wherein the autonomous tracking comprises autonomous longitudinal regulation and autonomous transverse regulation of the following vehicle on the basis of the match in the comparison result for the first and second and third and fourth pieces of coordination information.

5. The method as claimed in claim 1, wherein the first pieces of coordination information comprise absolute position information and absolute speed information and absolute steering angle information and absolute orientation information for the leading vehicle and the second pieces of coordination information comprise relative position information and relative speed information and relative orientation information for the leading vehicle in relation to the following vehicle.

6. The method as claimed in claim 1, wherein more than just a single following vehicle is autonomously tracked, wherein, in the case of autonomous tracking of more than just one following vehicle, the second pieces of coordination information are captured by means of the ambient sensors of a respective following vehicle on the basis of a driving movement by a vehicle traveling ahead of the respective following vehicle.

7. The method as claimed in claim 1, wherein a driver of the following vehicle is asked to make a manual input during the autonomous tracking of the following vehicle, with the autonomous tracking being terminated if the manual input is not made.

8. The method as claimed in claim 1, wherein a period of time for the autonomous tracking is limited to a prescribed proportion of a prescribed interval of time, particularly to 50 minutes per hour.

9. The method as claimed in claim 1, wherein the following vehicle uses seat occupancy recognition to monitor whether the driver is in the driver's seat, with the autonomous tracking being terminated if the driver is not in the driver's seat.

10. The method as claimed in claim 1, wherein the sent piece of vehicle identification information from the following vehicle is used to produce a piece of remuneration information that is specific to the following vehicle and that is dependent on distance and/or time.

11. A system for autonomously tracking a following vehicle in a lane of a leading vehicle, for carrying out the method as claimed in claim 1, comprising at least one leading vehicle controlled by a driver, a following vehicle, vehicle-to-X communication means in the leading vehicle and in the following vehicle for sending and receiving messages and information, driving movement sensors in the leading vehicle for providing first pieces of coordination information, coordination information comparison means in the following vehicle for comparing different pieces of coordination information and also ambient sensors in the following vehicle and/or a map memory, containing a digital map, in the following vehicle, wherein the leading vehicle sends a lead message that signals a readiness for autonomous tracking of following vehicles and comprises at least one piece of vehicle identification information and a piece of route information for the leading vehicle, wherein the following vehicle receives the lead message and rejects it or confirms it with a follow message that comprises at least one piece of vehicle identification information for the following vehicle, and wherein the leading vehicle, having received the follow message, sends a first piece of coordination information for coordinating the autonomous tracking to the following vehicle until the autonomous tracking ends, wherein the ambient sensors of the following vehicle capture second pieces of coordination information for coordinating the autonomous tracking on the basis of driving movements by the leading vehicle, wherein the coordination information comparison means compare the first and second pieces of coordination information to generate a comparison result, wherein the following vehicle carries out the autonomous tracking corresponding to the first and second pieces of coordination information if there is a match in the comparison result and wherein the following vehicle terminates the autonomous tracking if there is a discrepancy in the comparison result.

12. The system as claimed in claim 11, wherein the ambient sensors are selected from the group consisting of:
a radar sensor,
an optical camera sensor,
a lidar sensor,
a laser sensor and
an ultrasonic sensor and
the vehicle-to-X communication means sends and/or receives messages and/or information on the basis of one or more connection classes selected from the group consisting of
WLAN connection, particularly based on IEEE 802.11,
ISM (Industrial, Scientific, Medical Band) connection,
Bluetooth® connection,
ZigBee connection,
UWB (ultrawide band) connection,
WiMax® (Worldwide Interoperability for Microwave Access) connection,
infrared connection,
mobile radio connection and
radar-based communication.

* * * * *